United States Patent
Melchior et al.

(10) Patent No.: US 6,857,789 B2
(45) Date of Patent: Feb. 22, 2005

(54) COUPLING CONFIGURATION FOR COUPLING AN OPTICAL PLUG WITH A PLUG PIN TO A MOUNTING TUBELET

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/352,728

(22) Filed: Jan. 27, 2003

(65) Prior Publication Data

US 2003/0142918 A1 Jul. 31, 2003

(30) Foreign Application Priority Data

Jan. 25, 2002 (DE) .......................................... 102 03 961

(51) Int. Cl.7 .................................................. G02B 6/36
(52) U.S. Cl. ....................................................... 385/76
(58) Field of Search ............................. 385/76, 60, 66, 385/68, 77, 84, 139; 439/738, 787, 788

(56) References Cited

U.S. PATENT DOCUMENTS

| | | | |
|---|---|---|---|
| 4,875,752 A | | 10/1989 | Suzuki |
| 5,432,879 A | * | 7/1995 | Lee .............................. 385/60 |
| 5,608,828 A | * | 3/1997 | Coutts et al. ................. 385/59 |
| 5,673,347 A | * | 9/1997 | Pitassi ......................... 385/70 |
| 6,164,835 A | | 12/2000 | Imasaki |
| 6,565,264 B1 | * | 5/2003 | Johnson et al. .............. 385/78 |

FOREIGN PATENT DOCUMENTS

DE    88 11 463.5 U1    12/1988

* cited by examiner

*Primary Examiner*—Thanh-Tam Le
(74) *Attorney, Agent, or Firm*—Laurence A. Greenberg; Werner H. Stemer; Gregory L. Mayback

(57) ABSTRACT

A coupling configuration enables the coupling of an optical plug with a plug pin to a mounting tubelet wherein at least one optical conductor is arranged in at least one ferrule. The coupling configuration is formed with sleeve having a first and a second coupling region, and a further mounting tubelet. The first coupling region holds the mounting tubelet, and the second coupling region holds the further mounting tubelet. The further mounting tubelet is plugged at one of its ends onto a ferrule end, projecting from the first mounting tubelet, and is centered with respect to that end. The other end of the second mounting tubelet serves for holding the plug pin of an optical plug. The invention permits mechanical decoupling of the operation of plugging and coupling a plug pin from the operation of adjusting and positioning the light-guiding structures contained in the waveguide tubelet.

22 Claims, 2 Drawing Sheets

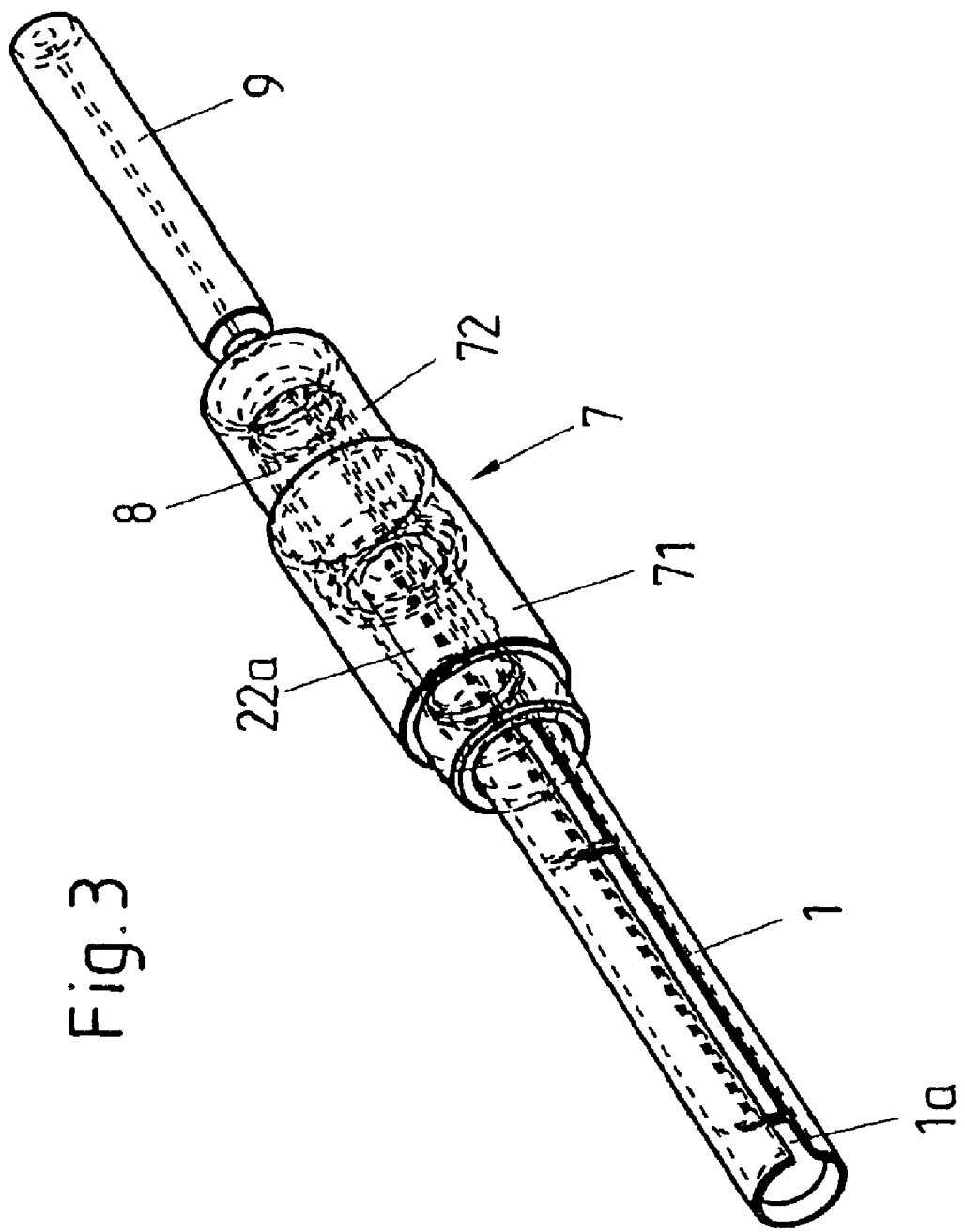

COUPLING CONFIGURATION FOR COUPLING AN OPTICAL PLUG WITH A PLUG PIN TO A MOUNTING TUBELET

BACKGROUND OF THE INVENTION

Field of the Invention

The invention relates to a coupling configuration for coupling an optical plug with a plug pin to a mounting tubelet wherein at least one optical conductor is arranged in at least one ferrule.

Mounting tubelets are known that serve for holding a plurality of optical conductor sections arranged in each case in a ferrule and center them with respect to one another. The mounting tubelets are preferably constructed in that case as split sleeves with a longitudinal slit that exert a spring force on the optical conductor sections of the ferrules and thereby hold and position them securely.

There is a need to couple an optical plug directly to such mounting tubelets. This has the advantage that it is possible for the optical conductors of the mounting tubelet to be coupled optically to one or more optical conductors of, for example, a WDM (Wavelength Division Multiplex) system in a simple and reversible way, and that at the same time a defined injection or extraction of optical signals into or from the optical conductor sections of the mounting tubelet is provided.

It would be possible in principle in this case for the optical conductor to be guided out at an optical conductor section as a fiber ribbon (so called pigtail solution). However, no direct coupling of an optical plug is achieved thereby.

It is known, furthermore, to use a mounting tubelet to hold an optical conductor, on the one hand, and a plug ferrule, on the other hand, and to center these with respect to one another. However, this simple solution is to be regarded as disadvantageous to the extent that plugging the plug pin into the mounting tubelet entails the risk of maladjustment of the optical conductor or conductors already present in the mounting tubelet.

SUMMARY OF THE INVENTION

It is accordingly an object of the invention to provide a coupling configuration for coupling an optical plug with a plug pin to a mounting tubelet, which overcomes the above-mentioned disadvantages of the heretofore-known devices and methods of this general type and which permits the plug pin to be coupled to the mounting tubelet without the risk of maladjustment of light guiding structures already present in the mounting tubelet. It is a particular object to provide for a reversible plug pin coupling that permits light to be injected with single-mode quality into the mounting tubelet or into the light-guiding structures contained in the latter.

With the foregoing and other objects in view there is provided, in accordance with the invention, a coupling configuration for coupling an optical plug with a plug pin, comprising:

a sleeve having a first coupling region and a second coupling region;

a first mounting tubelet disposed in said first coupling region, said first mounting tubelet having a ferrule end projecting therefrom;

a second mounting tubelet disposed in said second coupling region;

said second mounting tubelet having a first end plugged onto and being centered relative to said ferrule end of said first mounting tubelet and having a second end configured to hold the plug pin of the optical plug.

In other words, the coupling configuration according to the invention has a sleeve, with a first and a second coupling region, and a further mounting tubelet. The first coupling region of the sleeve holds the mounting tubelet (referred to as the first mounting tubelet), and the second coupling region holds the further mounting tubelet (referred to as the second mounting tubelet). In this case, the further mounting tubelet is plugged, at one of its ends, onto a ferrule end, projecting from the mounting tubelet, and is centered with respect to the latter. The other end of the further mounting tubelet serves for holding the plug pin of an optical plug.

A coupling configuration is thereby provided that uses a further mounting tubelet, which is plugged on to a waveguide section projecting from the mounting tubelet, or on to the corresponding ferrule. The further mounting tubelet is held by a sleeve that is connected, in turn, to the mounting tubelet. Consequently, a plug pin, which is to be coupled, of an optical plug does not come directly into contact with the mounting tubelet which already contains optical components. The risk of maladjustment and displacement of such components is thereby eliminated, specifically both when the plug pin is being plugged on, and also when it is being removed.

Since the two mounting tubelets (the first mounting tubelet and the second, or further mounting tubelet) are centered on a common waveguide section or on the ferrule projecting from the mounting tubelet and embracing the waveguide section; it is further rendered possible to transmit light with single-mode quality between the plug pin and the bordering waveguide section of the mounting tubelet (so called concentricity).

The coupling configuration according to the invention ensures mechanical decoupling of the operation of plugging and coupling a plug pin from the operation of adjusting and positioning the light-guiding structures contained in a waveguide tubelet, which are coupled to the plug pin. The adjusting operation is performed in this case before the plugging operation and is not endangered again by the latter.

In accordance with a preferred refinement of the invention, the further mounting tubelet is constructed in a spreadable fashion and arranged in a holding opening of the second coupling region of the sleeve. The inside diameter of the holding opening is greater in this case than the outside diameter of the further mounting tubelet. At the same time, the sleeve is pressed on to the mounting tubelet, likewise constructed in a spreadable fashion, in the first coupling region.

This refinement permits the advantages of the solution according to the invention to emerge particularly strongly. The spreadable further mounting tubelet is centered with respect to the ferrule projecting from the mounting tubelet.

At the same time, because of its smaller outside diameter by comparison with the inside diameter of the holding opening it can spread at its other end when a plug pin is plugged in. Consequently, when the plug pin is plugged in the mounting tubelet springs open, but then, by virtue of its spring force, centers the plug pin and the waveguide section projecting from the mounting tubelet. The risk of maladjustment of the waveguide section contained in the mounting tubelet is simultaneously reliably prevented by the pressed-on sleeve, which opposes spreading of the mounting tubelet and thus release of the waveguide sections.

In a further refinement of the invention, the sleeve is of bipartite instead of unipartite construction and comprises a first and a second sleeve part. One of the sleeve parts is connected in this case to the mounting tubelet, in particular is fitted on to the latter. The other sleeve part is firmly connected to the first sleeve part, in particular pressed together therewith. In the case of this refinement, the sleeve can be produced from relatively simply shaped individual elements.

The two sleeve parts preferably have the same inside diameter, in the region that holds the further mounting tubelet, so that they jointly form a holding opening whose inside diameter is greater than the outside diameter of the further mounting tubelet.

It is preferably provided that, at its end averted from the first sleeve part, the second sleeve part has an undercut for ensuring the holding of the further mounting tubelet such that the latter cannot fall out. Such an undercut can be constructed particularly easily on a separate sleeve part. In the case of a unipartite construction of the sleeve, the latter would preferably be produced initially without undercut. After the mounting of the further mounting tubelet, the latter could be secured by subsequently embossing an appropriate contour.

In order to connect the two sleeve parts, it is preferably provided that, at the end averted from the mounting tubelet, the first sleeve part has a guide bore into which the second sleeve part is fitted. It is further preferably provided that that the first and/or the second sleeve part form an axial stop. The axial stop is provided, for example, by a flank on the sleeve and serves as an axial stop in mounting the housing so as to permit precise positioning with reference to a housing.

The further mounting tubelet preferably consists of ceramic. By comparison with bronze, for example, of which the mounting tubelet preferably consists, ceramic has a substantially lower level of wear.

Other features which are considered as characteristic for the invention are set forth in the appended claims.

Although the invention is illustrated and described herein as embodied in a coupling configuration for coupling an optical plug with a plug pin to a mounting tubelet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a perspective view of the coupling configuration of FIGS. 1 and 2.

DESCRIPTION OF THE PREFERRED EMBODIMENTS

Figure 1:
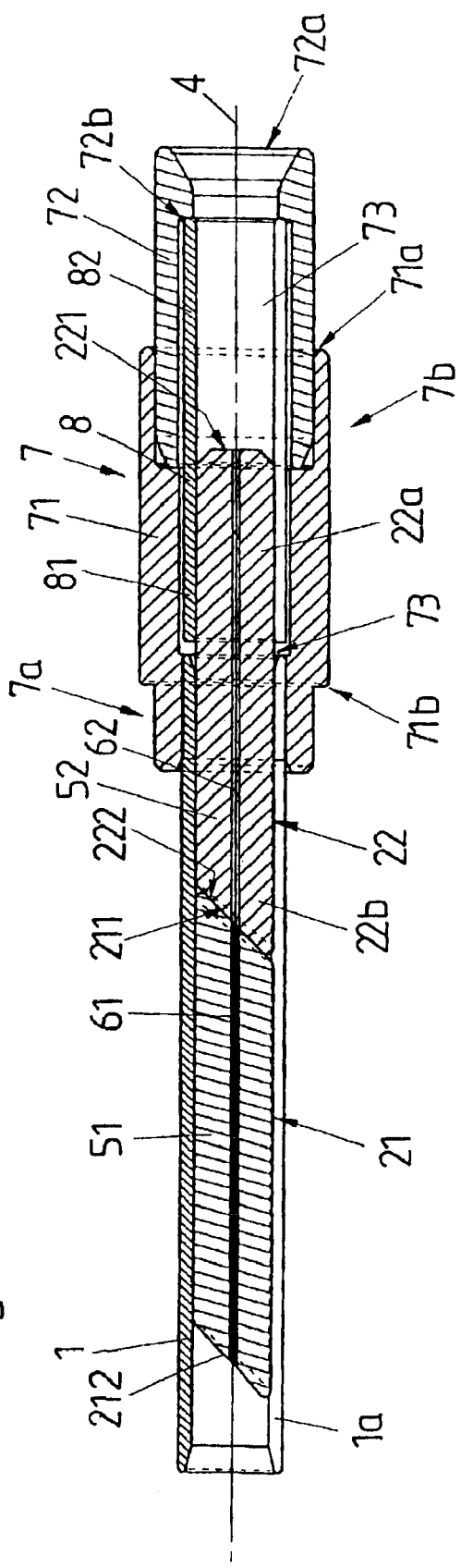
FIG. 1 is a longitudinal section taken through a coupling configuration for a mounting tubelet along the line I—I in FIG. 2.

Referring now to the figures of the drawing in detail, there is shown a standard mounting tubelet 1 (also referred to as a first mounting tubelet) that preferably consists of phosphor bronze and wherein a plurality of waveguide sections 21, 22 are arranged axially one behind another. The exemplary embodiment is illustrated with two such waveguide sections. One waveguide section 22 projects by a defined extent from the mounting tubelet 1 and has at its projecting end 22$a$ a polished end face 221 arranged at an angle of 90° to the longitudinal axis 4 of the mounting tubelet 1. A polished end face 222 aligned at an angle of 45° to a longitudinal axis 4 is located at its other end 226 inside the mounting tubelet 1.

The waveguide section 21 adjoining one waveguide section 22 has two polished end faces 211, 212 aligned in each case at an angle of 45° to the longitudinal axis 4 of the mounting tubelet 1. It is also possible in principle in each case for an angle differing from 45° to be provided at both waveguide sections 21, 22.

Each waveguide section 21, 22 comprises a ferrule (fiber stub) 51, 52 and an actual optical conductor 61, 62 that guides optical signals to be transmitted, the optical conductors 61, 62 being guided in each case in a way known per se in a central, high-precision bore in the ferrule 51, 52. The ends of the optical conductors 61, 62 are likewise beveled in this case. "Ferrule" is understood as any structure that embraces and holds the actual optical conductor. Ferrules usually consist of ceramic or plastic. In the present case they consist, however, of glass in order, as will be set forth later, to permit light to be injected and/or extracted perpendicular to the longitudinal axis 4 of the mounting tubelet 1 at the end faces 211, 222, bearing against one another, of the waveguide sections 21, 22.

The mounting tubelet 1 is constructed as a split sleeve and has a longitudinal slit 1$a$ for this purpose.

Because of its construction as a split sleeve, the mounting tubelet 1 exerts a springing force on the waveguide sections 21, 22 and centers both with their optical conductors 61, 62 positioned exactly in the core.

The two waveguide sections 21,22 are mounted in the mounting tubelet 1 in such a way that the polished end faces 211, 222 aligned at an angle of 45° bear against one another. A possibly present gap between the end faces 211, 222 can be filled by an immersion gel. A wavelength-selective filter (not illustrated separately) is applied to the beveled, polished end face 211 of the left-hand waveguide section 21. Light that is injected into one waveguide section 22 via the perpendicularly aligned end face 221 and strikes the wavelength-selective filter either passes this filter as a function of its wavelength and is consequently injected into the bordering waveguide section 21, or it is reflected at the filter and extracted perpendicularly or substantially perpendicularly in relation to the longitudinal axis of the mounting tubelet 1, wherein case it transilluminates the sheath of the glass ferrule 51 and passes through the longitudinal slit 1$a$ of the mounting tubelet. In this case, the filter surfaces are aligned with reference to their angle of rotation such that the light is emitted substantially precisely downward and thus through the longitudinal slit 1$a$.

There is thus a separation (or a unification in the case of the inverse beam path) of light signals of different wavelengths $\lambda 1$, $\lambda 2$.

Consequently, the mounting tubelet is preferably located in an overall apparatus wherein there are arranged at a right angle or approximately at a right angle to the longitudinal axis 4 of the waveguide tubelet 1 one or a plurality of transmitting and/or receiving devices via which light is injected and/or extracted into or from the waveguide 61, 62 in a wavelength-selective fashion.

In an alternative refinement, there is provided instead of a wavelength-selective filter a beam splitter that is fitted on the beveled, polished end face 211 of the left-hand waveguide section 21. This is a 3 dB beam splitter, for example. Because of the beam splitter, incident light is only partially passed on and injected into the bordering waveguide section 21. The other portion is reflected and extracted.

There is now a need in the case of a waveguide tubelet 1 of the type described to fit an optical plug directly for coupling one or more optical fibers. In particular, it is worth aiming at a pin coupling with single-mode quality, a plug pin of an optical plug known per se being coupled directly to the waveguide sections 21, 22 in the mounting tubelet.

It is fundamentally conceivable, for this purpose, to lengthen the mounting tubelet 1 beyond the end face of one waveguide section 22, and to plug a plug pin, to be coupled, of an optical plug into the lengthened region of the mounting tubelet and center it together with the two waveguide sections 21, 22 already contained in the mounting tubelet. A disadvantage of such a solution consists, however, in that, when plugging in the plug pin, the common mounting tubelet 1, which also embraces the two waveguide sections 21, 22 provided with beveled end faces 211, 222, must also be lightly spread. As a result, the waveguide sections 21, 22 are exposed and there is the risk that these will be displaced and become maladjusted.

Instead of this, a coupling configuration is provided that comprises a sleeve 7 and a further mounting tubelet 8 (also referred to as a second mounting tubelet). In the exemplary embodiment illustrated, the sleeve 7 is of bipartite design and comprises a first sleeve part 71 and a second sleeve part 72. The sleeve part 71 is pressed with its end facing the mounting tubelet 1 on to the corresponding end of the mounting tubelet 1. This reliably prevents spreading of the mounting tubelet 1, such that there is no need to fear maladjustment of the waveguide sections 21, 22 during coupling of an optical plug. The region wherein the sleeve 7 or the sleeve part 71 holds the mounting tubelet 1 in this case constitutes a first coupling region 7a of the sleeve.

It may be pointed out that the waveguide section 22a projecting by a defined extent from the mounting tubelet 1 now projects into an inner bore/holding opening 73 of the sleeve 7.

At its end that is diverted from the mounting tubelet 1, the sleeve part 71 has a guide bore 71a into which a second sleeve part 72 is fitted.

Furthermore, the first sleeve part 71 has a stop 71b, constructed as a flank, with exactly defined dimensions and an exactly defined tolerance in relation to the injection and extraction sites in the waveguide section 22. The flank 71b serves as stop when mounting the housing, the stop performing accurate positioning of the mounting tubelet 1 and thus also of the end face 221 into which light is injected or extracted into or from the waveguide section 22 via a plug pin.

The second sleeve part 72 serves in cooperation with the first sleeve part for holding the further mounting tubelet 8 and a plug pin 9, as will be explained below. The second sleeve part 72 in this case has a holding opening 72a that coincides with the inner bore 73 of the sleeve 7 or merges into the latter. In this case, an undercut 72b is provided that prevents the inserted mounting tubelet 8 from falling out. The region of the inner bore 73 that serves for holding the further mounting tubelet 8 constitutes a second coupling region 7b of the sleeve 7.

The two sleeve parts 71, 72 have the same inside diameter. The inside diameter of the sleeve parts 71, 72 is greater in this case than the outside diameter of the further mounting tubelet 8.

The further mounting tubelet 8 is likewise constructed as a spreadable split sleeve with a longitudinal slit. It preferably consists of ceramic, which has a low level of wear. At one 81 of its ends, the further mounting tubelet 8 is pressed, inside the inner bore 73 of the sleeve 7, onto the ferrule end 22a projecting from the mounting tubelet 1, being a connection without play. The two mounting tubelets 1, 8 are centered with respect to one another via one waveguide section 22 or the ferrule end 22a thereof.

Figure 2:
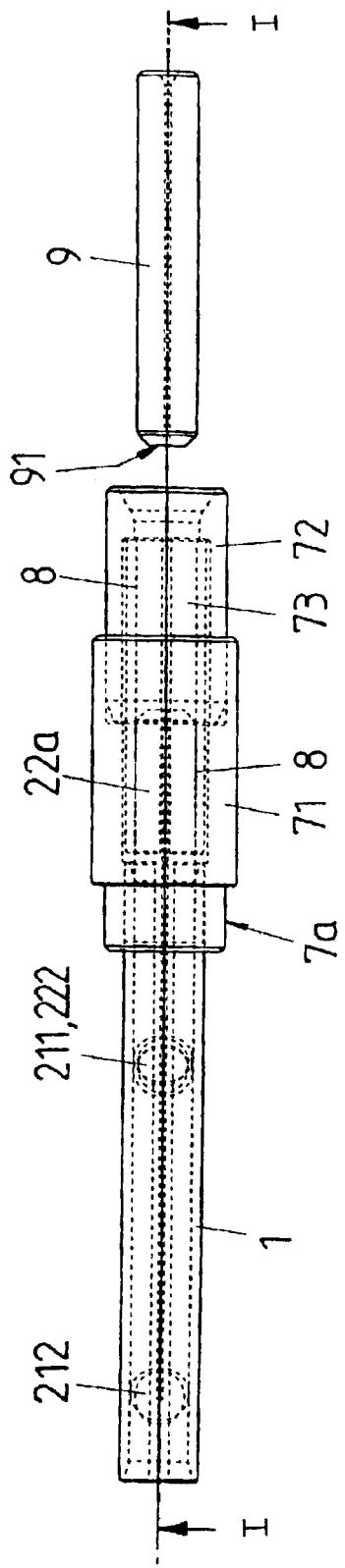
FIG. 2 is a plan view of the coupling configuration according to the invention.

The other end 82 of the further mounting tubelet 8 serves for holding a plug pin 9 illustrated schematically in FIGS. 2 and 3. The plug pin 9 constitutes a plug ferrule that is part of an optical plug known per se. For the sake of clarity, the further conventional plug constituents are not illustrated.

The plug pin 9 slides into the ceramic split sleeve 8 during the plugging operation. Since the plug ferrule 9 will always be at a wrong, if only slightly so, angle to the axis 4 of the further mounting tubelet 8, the further mounting tubelet 8 is expanded resiliently during the plugging operation. This is possible since the diameter of the inner bore 73 of the sleeve 7 is greater than the outside diameter of the further mounting tubelet 8. The plug pin 9 slides up to making physical contact between the end face 91 of the plug pin 9 and the end face 222 of the bordering waveguide section 22. The plug pin 9 and waveguide section 22 are automatically centered in this case by the resiliently constructed further mounting tubelet such that an optical coupling with single-mode quality results.

The spreading and the centering action of the further mounting tubelet 8 are mechanically decoupled from the guiding and adjusting of the waveguide sections 21, 22 of the mounting tubelet 1. The risk of maladjustment of the waveguide sections contained in the mounting tubelet 1 is reliably prevented by the pressed-on sleeve 7, which opposes spreading of the mounting tubelet 1 and thus release of the waveguide sections 21, 22.

The configuration and structural design of the invention are not limited to the exemplary embodiments illustrated above. By way of example, it may be provided to construct the sleeve 7 in a unipartite fashion. Again, other materials than those described above can be used.

We claim:

1. A coupling configuration for coupling an optical plug with a plug pin, comprising:
   - a sleeve having a first coupling region and a second coupling region;
   - a first mounting tubelet disposed in said first coupling region, said first mounting tubelet having a ferrule end projecting therefrom;
   - a second mounting tubelet formed as a spreadable tubelet and disposed in a holding opening formed in said second coupling region of said sleeve, said holding opening having an inner diameter greater than an outer diameter of said second mounting tubelet; and
   - said second mounting tubelet having a first end plugged onto and being centered relative to said ferrule end of said first mounting tubelet and having a second end configured to hold the plug pin of the optical plug.

2. The coupling configuration according to claim 1, wherein said first mounting tubelet is a spreadable tubelet.

3. The coupling configuration according to claim 1, wherein said sleeve is pressed onto said first mounting tubelet substantially without play in said first coupling region.

4. The coupling configuration according to claim 1, wherein said sleeve is a bipartite sleeve comprising a first sleeve part connected to said first mounting tubelet and a second sleeve part.

5. The coupling configuration according to claim 4, wherein said first and second sleeve parts have a same inner diameter, at least in a region holding said second mounting tubelet.

6. The coupling configuration according to claim 4, wherein said second sleeve part is formed with an undercut, at an end thereof averted from said first sleeve part, for ensuring a holding of said second mounting tubelet.

7. The coupling configuration according to claim 4, wherein at least one of said first and second sleeve parts is configured to form an axial stop.

8. The coupling configuration according to claim 1, wherein said second mounting tubelet is a ceramic tubelet.

9. The coupling configuration according to claim 1, wherein said first mounting tubelet is a bronze tubelet.

10. The coupling configuration according to claim 1, which comprises a plurality of waveguide sections coupled to one another via beveled end faces and arranged axially one behind another in said first mounting tubelet.

11. The coupling configuration according to claim 10, wherein each of said first mounting tubelet and said second mounting tubelet is formed with a longitudinal slit for resiliently holding said waveguide sections or the plug pin.

12. A coupling configuration for coupling an optical plug with a plug pin, comprising:
    a sleeve having a first coupling region and a second coupling region;
    a first mounting tubelet disposed in said first coupling region, said first mounting tubelet having a ferrule end projecting therefrom;
    a second mounting tubelet disposed in said second coupling region;
    said second mounting tubelet having a first end plugged onto and being centered relative to said ferrule end of said first mounting tubelet and having a second end configured to hold the plug pin of the optical plug;
    said sleeve being a bipartite sleeve comprising a first sleeve part connected to said first mounting tubelet and a second sleeve part fitted into a guide bore formed in said first sleeve part at an end thereof averted from said first mounting tubelet.

13. The coupling configuration according to claim 12, wherein said second mounting tubelet is a spreadable tubelet arranged in a holding opening formed in said second coupling region of said sleeve, said holding opening having an inner diameter greater than an outer diameter of said second mounting tubelet.

14. The coupling configuration according to claim 12, wherein said first mounting tubelet is a spreadable tubelet.

15. The coupling configuration according to claim 12, wherein said sleeve is pressed onto said first mounting tubelet substantially without play in said first coupling region.

16. The coupling configuration according to claim 12, wherein said sleeve is a bipartite sleeve comprising a first sleeve part connected to said first mounting tubelet and a second sleeve part.

17. The coupling configuration according to claim 16, wherein said first and second sleeve parts have a same inner diameter, at least in a region holding said second mounting tubelet.

18. The coupling configuration according to claim 16, wherein said second sleeve part is formed with an undercut, at an end thereof averted from said first sleeve part, for ensuring a holding of said second mounting tubelet.

19. The coupling configuration according to claim 12, wherein said second mounting tubelet is a ceramic tubelet.

20. The coupling configuration according to claim 12, wherein said first mounting tubelet is a bronze tubelet.

21. The coupling configuration according to claim 12, which comprises a plurality of waveguide sections coupled to one another via beveled end faces and arranged axially one behind another in said first mounting tubelet.

22. The coupling configuration according to claim 21, wherein each of said first mounting tubelet and said second mounting tubelet is formed with a longitudinal slit for resiliently holding said waveguide sections or the plug pin.

* * * * *